R. LOVE.
FIFTH WHEEL FOR FERTILIZER DISTRIBUTERS.
APPLICATION FILED JAN. 22, 1903.

1,019,064.

Patented Mar. 5, 1912.

3 SHEETS—SHEET 1.

WITNESSES:
Chas. J. Jones,
Herman McGann.

INVENTOR
Robert Love
BY
Hoyt Parsons
ATTORNEYS

COLUMBIA PLANOGRAPH CO., WASHINGTON, D. C.

R. LOVE.
FIFTH WHEEL FOR FERTILIZER DISTRIBUTERS.
APPLICATION FILED JAN. 22, 1903.
1,019,064.
Patented Mar. 5, 1912.
3 SHEETS—SHEET 2.
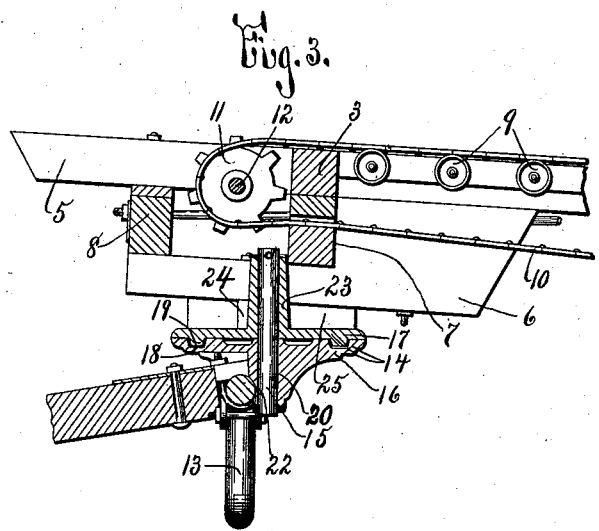
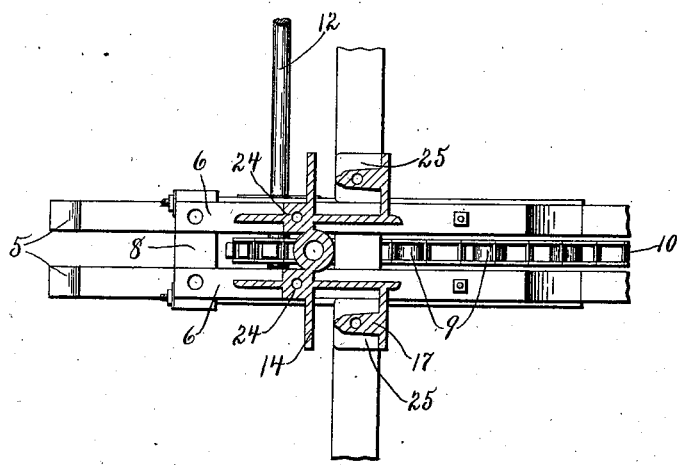
WITNESSES:
Chas. J. Foner.
Herman Mc Gann.
INVENTOR
Robert Love
BY
Heys Parsons
ATTORNEYS R. LOVE.
FIFTH WHEEL FOR FERTILIZER DISTRIBUTERS.
APPLICATION FILED JAN. 22, 1903.
1,019,064.
Patented Mar. 5, 1912.
3 SHEETS—SHEET 3.
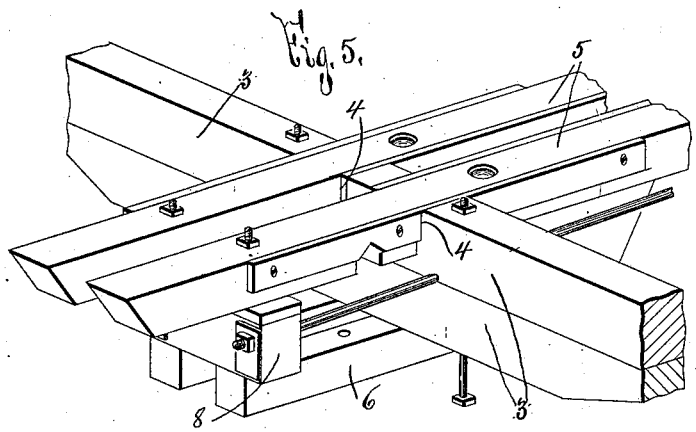
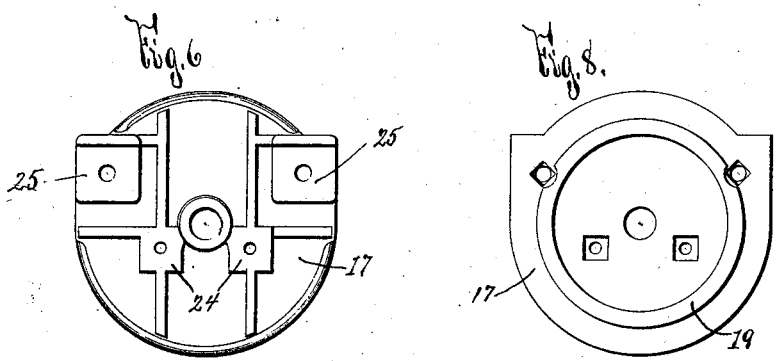
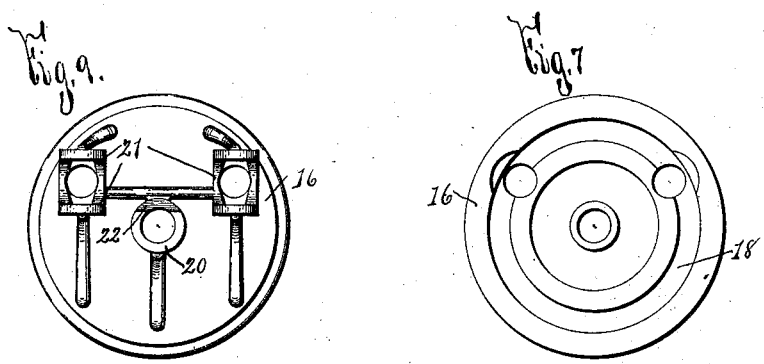
WITNESSES:
INVENTOR
Robert Love
BY
ATTORNEYS

UNITED STATES PATENT OFFICE.

ROBERT LOVE, OF SYRACUSE, NEW YORK, ASSIGNOR, BY MESNE ASSIGNMENTS, TO DEERE & COMPANY, OF MOLINE, ILLINOIS, A CORPORATION OF ILLINOIS.

FIFTH-WHEEL FOR FERTILIZER-DISTRIBUTERS.

1,019,064.   Specification of Letters Patent.   Patented Mar. 5, 1912.

Application filed January 22, 1903. Serial No. 140,075.

*To all whom it may concern:*

Be it known that I, ROBERT LOVE, of Syracuse, in the county of Onondaga and State of New York, have invented a certain new and useful Fifth-Wheel for Fertilizer-Distributers, of which the following is a specification.

My invention relates to fertilizer-distributers, and has for its object a fifth wheel therefor which is particularly simple in construction and strong and durable in use; and to this end, it consists in the combinations and devices hereinafter described and pointed out in the claims.

In describing this invention, reference is had to the accompanying drawing in which like characters indicate corresponding parts in all the views.

Figure 1:
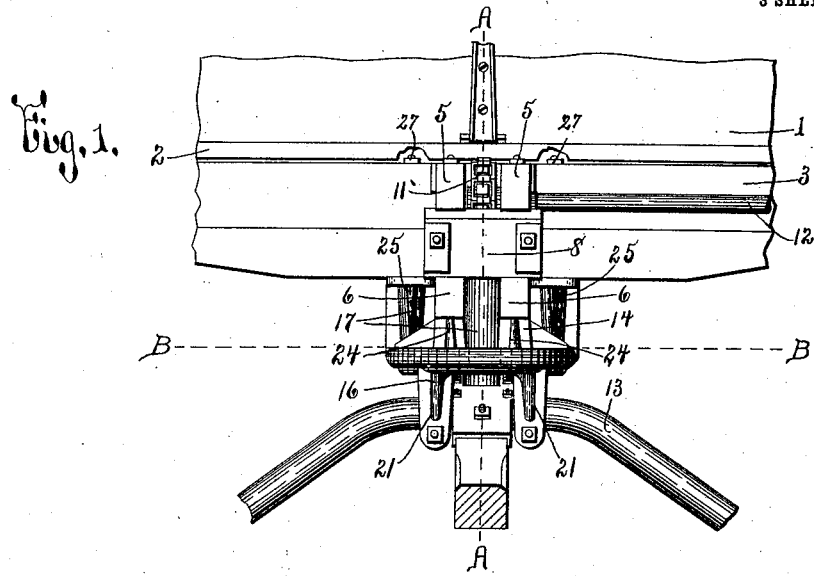
Figure 2:
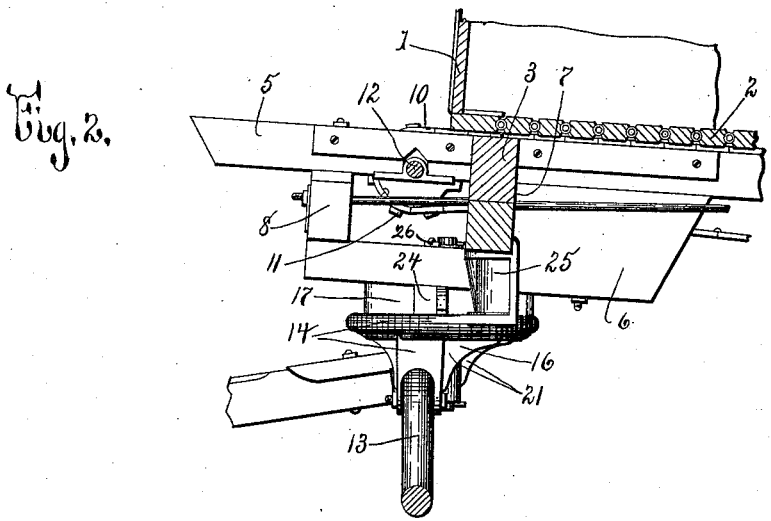

Figure 1 is a front elevation partly broken away, of a portion of the front end of a fertilizer-distributer embodying my invention. Fig. 2 is a side elevation partly broken away of the parts seen in Fig. 1. Figs. 3 and 4, are sectional views taken, respectively, on lines A—A and B—B Fig. 1, looking respectively to the left, and upwardly. Fig. 5 is an isometric view of a portion of the main frame of the receptacle for the fertilizer. Fig. 6 is a top plan view of the upper section of the fifth wheel. Fig. 7 is a similar view of the lower section. Fig. 8 is an inverted plan view of the upper section, and Fig. 9 is a similar view of the lower section.

The receptacle 1 for the fertilizer is preferably provided with a main frame and a moving bottom 2; said main frame comprises a transverse bar 3 formed with mortises 4 extending downwardly from its upper edge, separated longitudinal bars 5 arranged within said mortises, and projecting beyond the front and rear faces of the bar 3, additional longitudinal bars 6 arranged beneath the bar 3, and projecting beyond the front and rear faces thereof, and having substantially upright shoulders 7 engaged with the rear face of the bar 3. The upper faces of the rear ends of the longitudinal bars 6, are generally engaged with lower faces of the bars 5 at the rear of the transverse bar 3, and the opposing faces of the bars 5 6 in front of the transverse bar 3, are separated from each other and engaged at their front ends with upper and lower surfaces of a transverse bar 8 arranged in front of the bar 3.

As is obvious to those skilled in the art, the described construction of frame for the receptacle 1, is particularly strong and durable.

The moving bottom 2 consists of transverse slats movable over rollers 9, supported by the main frame of the receptacle 1, and is actuated by any suitable means, here illustrated as a chain 10, driven by a sprocket wheel 11, which is engaged with said chain, is arranged between the transverse bars 3 8, and is rotated by a shaft 12, to which any desirable power-transmitting means may be connected.

The front end of the frame of the receptacle is supported upon the front axle 13 by a fifth-wheel 14, comprising a king-pin 15 and lower and upper sections 16 17, and means for securing said sections, respectively, to the front axle 13 and to the main frame of the receptacle 1. The opposing faces of the sections 16, 17 are provided with an interengaging tongue and groove disposed concentric to the king pin 15. In the particular exemplification of my invention illustrated in the accompanying drawing the groove designated by the numeral 18 is provided in the section 16, while the tongue, designated by the numeral 19, is carried by the section 17. The lower section 16 of the fifth-wheel is provided with a depending hub 20 and depending arms 21 21, arranged at opposite sides of the hub 20, and supported directly on the front axle 13 the arms 21 having alined cutouts or recesses at their ends for receiving the crank portion of the axle 13, and the inner walls of such cutouts or recesses constituting bearing faces for the axle. The lower part of the hub 20 is arranged at the rear of the intermediate portion of the front axle 13, and is formed with a cutout 22, for receiving the contiguous part of said portion of the axle 13.

As best seen in Figs. 1 and 2, the upper section 17 of the fifth-wheel, is provided with a hub 23, interposed between the longitudinal bars 6—6, and formed with an opening for receiving the king-pin 15, and is also provided with upwardly extending parts 24 having their top faces engaged with lower surfaces of the longitudinal bars 6, and with additional upwardly extending parts 25 projecting above the parts 24, at the sides of the bars 6, and having their top faces arranged above the corresponding faces of the parts 24 and engaged with lower surfaces of the transverse bar 3. Said section 17 is preferably secured to the main frame of the receptacle 1, by bolts 26 extending through the parts 24 and above the top faces of said parts through the bars 6 and additional bolts 27, extending through the parts 25 and above the top faces of said parts through the bar 3.

My invention also contemplates a novel connection between the tongue of the vehicle and the axle 13, which coacts with the particular construction of fifth wheel mechanism described. As premised, the hub 20 is located directly to the rear of the axle 13 in close juxtaposition thereto and approximately centrally of the length of the same. Upon each side of this hub, the arms 21 described are located so that a space separates the same directly to the rear of which is the hub 20. The latter is of slightly less diameter than the distance between said arms. The rear or inner end of the tongue is provided with an extension which extends across the top of the axle, and is bifurcated to accommodate said hub. In each of the arms formed by said bifurcation a U-shaped clip is secured, which embraces the axle 13 to couple the tongue thereto.

The illustrated and described fifth-wheel is particularly simple in construction and strong and durable in use.

The construction and operation of my fertilizer-distributer will now be readily understood upon reference to the foregoing description and the accompanying drawing, and it will be noted that more or less change may be made in the construction and operation of the component parts thereof without departing from the spirit of my invention.

Having thus fully described my invention, what I claim as new and desire to secure by Letters Patent, is:—

1. The combination with a main frame and an axle, of a fifth wheel comprising upper and lower sections, the upper section having means for engaging the frame, and the lower section being provided with a depending axial hub and with depending arms arranged in front of the hub and on opposite sides of the same, said arms having bearings for the axle, and a tongue secured to the axle between said arms, substantially as and for the purpose described.

2. The combination with a main frame provided with surfaces unequally separated from the ground; of a fifth-wheel comprising a lower section secured to the front axle, an upper section having upwardly-extending parts of unequal length engaged with said surfaces of the main frame, means for securing the upper section of the fifth-wheel to said main frame, and means for securing the sections of the fifth-wheel together, substantially as and for the purpose set forth.

3. The combination with a main frame comprising a transverse bar and longitudinal bars having their front ends arranged beneath the transverse bar; of a fifth-wheel comprising a lower section secured to the front axle, an upper section having faces engaged with the lower surfaces of the front ends of the longitudinal bars and engaged with the lower surface of the transverse bar, and means for securing the upper section of the fifth-wheel to the main frame, substantially as and for the purpose specified.

4. The combination with a main frame provided with surfaces unequally separated from the ground; of a fifth-wheel comprising a lower section secured to the front axle, an upper section having upwardly extending parts of unequal length engaged with said surfaces of the main frame, means for securing the upper section of the fifth-wheel to said main frame, and a king-pin substantially as and for the purpose set forth.

5. The combination with a main frame comprising a transverse bar and longitudinal bars having their front ends arranged beneath the transverse bar; of a fifth-wheel comprising a lower section secured to the front axle, an upper section having faces engaged with lower surfaces of the front ends of the longitudinal bars, and additional faces arranged above the former faces at the sides of the front ends of the longitudinal bars and engaged with lower surfaces of the transverse bar, means for securing the upper section of the fifth-wheel to said main frame, and a king-pin substantially as and for the purpose described.

6. The combination with a main frame comprising a transverse bar and longitudinal bars having their front ends arranged beneath the transverse bar; of a fifth-wheel comprising a lower section secured to the front axle, an upper section having faces engaged with lower surfaces of the front ends of the longitudinal bars, and additional faces arranged above the former faces at the sides of the front ends of the longitudinal bars and engaged with lower surfaces of the transverse bar, bolts projecting from the first faces of the upper section of the fifth-wheel through the longitudinal bars, additional bolts projecting from the additional faces of said upper section through the transverse bar, and a king-pin substantially as and for the purpose specified.

7. The combination with a main frame comprising a transverse bar and separated longitudinal bars having their front ends arranged beneath the transverse bar; of a fifth-wheel comprising a king-pin, a lower section secured to the axle, an upper section having a hub interposed between the longitudinal bars and formed with an opening for receiving the king-pin, said upper section also having faces arranged at opposite sides of the hub and engaged with lower surfaces of the front ends of the longitudinal bars, and additional faces arranged above the former faces at the sides of the front ends of the longitudinal bars and engaged with lower surfaces of the transverse bar, and means for securing the upper section of the fifth-wheel to said main frame, substantially as and for the purpose set forth.

8. In a vehicle having frame members with bearing surfaces disposed in different planes, a fifth wheel comprising two sections, one of said sections having an arm extending therefrom with bearing surfaces at the end of the same disposed in different planes coacting with the surfaces of said frame members, substantially as described.

9. In a vehicle having frame members with bearing surfaces disposed in different planes, a fifth wheel comprising two sections, one of said sections having an arm extending therefrom with horizontally-extending bearing surfaces at the end of the same disposed in different planes, substantially as described.

10. In a vehicle having frame members with bearing surfaces disposed in different planes, a fifth wheel comprising two sections, a pair of arms projecting from one face of the upper section thereof having substantially horizontally-disposed bearing surfaces at their ends, and other arms arranged in advance of the first having substantially horizontally-extending bearing surfaces disposed in a different horizontal plane from that of the bearing surfaces of the first arms, substantially as described.

11. In a vehicle and in combination, a fifth wheel comprising two sections, a pair of arms projecting from one face of the upper section thereof having substantially horizontally - disposed bearing surfaces at their ends, and other arms arranged in advance of the first having substantially horizontally - extending bearing surfaces disposed in a lower horizontal plane than the bearing surfaces of the first arms, substantially as described.

12. In a vehicle, and in combination, a fifth wheel comprising an upper and a lower section, the latter section having a hub depending axially therefrom and provided with a central bore, and depending arms separated from each other and arranged upon each side and in advance of said hub, and an axle secured to said arms, substantially as and for the purpose set forth.

13. In a vehicle, and in combination, a fifth wheel comprising an upper and a lower section, the latter section having arms depending therefrom and formed with alined bearing faces at their ends, said arms being located on opposite sides of a vertical plane intersecting the axis of said section and extending diametrically of the same and in advance of a second vertical plane also intersecting said axis and extending at right angles to the first plane, and an axle extending across the bearing faces in said depending arms, substantially as and for the purpose described.

14. In a vehicle and in combination, a fifth wheel comprising an upper and a lower section, the latter section having arms depending therefrom provided with transverse alined bearing faces, said arms being located upon opposite sides of a vertical plane intersecting the axis of the section and in advance of a second vertical plane also intersecting said axis and extending at right angles to the first plane, and a hub depending axially from said section having a recess therein contiguous to said arms and an axle engaging the bearing faces and extending into the recess, substantially as described.

In testimony whereof, I have hereunto signed my name in the presence of two attesting witnesses, at Syracuse, in the county of Onondaga, in the State of New York, this 21st day of January, 1903.

ROBERT LOVE.

Witnesses:
 S. DAVIS,
 D. LAVINE.

---

Copies of this patent may be obtained for five cents each, by addressing the " Commissioner of Patents, Washington, D. C."